US012495097B2

(12) United States Patent
Benrikhi et al.

(10) Patent No.: US 12,495,097 B2
(45) Date of Patent: Dec. 9, 2025

(54) METHOD FOR UPDATING A PRESENCE STATUS OF A USER OF A COMMUNICATION TERMINAL FOR A SET OF COMMUNICATION APPLICATIONS

(71) Applicant: ORANGE, Issy-les-Moulineaux (FR)

(72) Inventors: Anne Benrikhi, Chatillon (FR); Romain Carbou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 183 days.

(21) Appl. No.: 18/002,991

(22) PCT Filed: Jun. 23, 2021

(86) PCT No.: PCT/FR2021/051154
§ 371 (c)(1),
(2) Date: Dec. 22, 2022

(87) PCT Pub. No.: WO2021/260328
PCT Pub. Date: Dec. 30, 2021

(65) Prior Publication Data
US 2023/0262140 A1 Aug. 17, 2023

(30) Foreign Application Priority Data

Jun. 24, 2020 (FR) ...................................... 2006590

(51) Int. Cl.
*H04L 67/54* (2022.01)
*H04L 41/06* (2022.01)
*H04L 51/043* (2022.01)
(52) U.S. Cl.
CPC .............. *H04L 67/54* (2022.05); *H04L 41/06* (2013.01); *H04L 51/043* (2013.01)
(58) Field of Classification Search
CPC ........ H04L 67/54; H04L 41/06; H04L 51/043
(Continued)

(56) References Cited

U.S. PATENT DOCUMENTS

2016/0042428 A1* 2/2016 Gou .................... G06Q 30/0631
705/26.7

FOREIGN PATENT DOCUMENTS

WO    WO 03/037007    *   5/2003
WO    WO 03/037007 A1    *   5/2003

OTHER PUBLICATIONS

International Search Report dated Nov. 5, 2021 for corresponding International Application No. PCT/FR2021/051154, filed Jun. 23, 2021.

(Continued)

*Primary Examiner* — Hermon Asres
(74) *Attorney, Agent, or Firm* — David D. Brush; Westman, Champlin & Koehler, P.A.

(57) ABSTRACT

Updating a presence status of a user of a communication terminal for a set of at least one communication application. The terminal is connected to a communication network via a network interface. The method includes: detecting in the terminal a functional event a consequence of which is a future deactivation of the network interface; sending, by the terminal to a "status update server" an event notification of the deactivation event, which includes an identifier of the user; following receipt of the event notification by the server, determining from the identifier of the user, for each of the communication applications, a specific presence status corresponding to the detected event; sending by the server, to each network platform respectively hosting at least one of the communication applications, a request to update a current presence status of the user for the communication application, with the specific presence status for the communication application.

12 Claims, 3 Drawing Sheets

(58) Field of Classification Search
USPC .......................................................... 709/223
See application file for complete search history.

(56) References Cited

OTHER PUBLICATIONS

Written Opinion of the International Searching Authority dated Nov. 5, 2021 for corresponding International Application No. PCT/FR2021/051154, filed Jun. 23, 2021.
English translation of the Written Opinion of the International Searching Authority dated Nov. 5, 2021 for corresponding International Application No. PCT/FR2021/051154, filed Jun. 23, 2021.

* cited by examiner

METHOD FOR UPDATING A PRESENCE STATUS OF A USER OF A COMMUNICATION TERMINAL FOR A SET OF COMMUNICATION APPLICATIONS

CROSS-REFERENCE TO RELATED APPLICATIONS

This Application is a Section 371 National Stage Application of International Application No. PCT/FR2021/051154, filed Jun. 23, 2021, which is incorporated by reference in its entirety and published as WO 2021/260328 A1 on Dec. 30, 2021, not in English.

TECHNICAL FIELD

The present invention deals generally with the field of telecommunication networks, and relates notably to the interaction of a communication terminal with social network platforms. The invention targets in particular a method for updating a presence status of a user of a communication terminal for a set of communication applications.

STATE OF THE ART

These days, with the growing development of mobile terminals of smartphone type, and other digital tablets connected to the Internet, users are increasingly communicating and exchanging messages with their contacts by notably using communication applications commonly called "social network applications", which include in particular messaging systems of "instant messaging" type. To recap, instant messaging allows the instantaneous (that is to say in real time) exchange of text messages and files between several people via terminals connected to one and the same computer network, most often the Internet. Unlike electronic mail, instant messaging makes it possible to conduct an interactive dialog, which makes this type of communication very popular. Among the social networks that are available on the market for mobile terminals, examples that can be cited include WhatsApp™ (Facebook), iMessage™ (Apple), Facebook Messenger™ (Facebook), or Twitter™.

Each of the social network applications is installed in the terminal (as a native application or by the user) and allows the terminal to connect to the platform of the social network application via the communication network, such as the Internet.

One feature common to social network applications and in particular to the instant messaging systems which are associated with them is the possibility offered to the user of indicating his or her presence status, also referred to as "status", for the social network application concerned. Such a "status" of the user can, for example, be: "available", "busy", "disconnected", "absent", etc. In some circumstances, it is the application itself which updates the status of the user, for example by associating with him or her the "offline" status when the terminal of the user is not connected to the communication network.

There are circumstances of inactivity of the network interfaces of the terminal in which the user does not have the possibility of updating his or her status for the social network application concerned. Such is for example the case when the terminal is suddenly located in a zone in which there is no network coverage, in particular when the user is traveling (in a train for example); such is also the case when the terminal switches off because its battery is drained.

Moreover, a mobile terminal of smartphone type conventionally comprises a certain number of user controls allowing the user to deactivate all or some of the network interfaces of the terminal or of the services supplied thereby, for example the deactivation of mobile data for the mobile network interface (3G, 4G networks) to limit the electrical consumption of the terminal or the billed data consumption, of the Wi-Fi interface or of the Bluetooth™ interface, or of all the network interfaces simultaneously, that is to say by switching the terminal to "airplane mode".

When the user implements the abovementioned terminal controls linked notably to the connection to the Internet network via a mobile access network (3G, 4G) or a Wi-Fi network, the user does not necessarily have the time or even the desire to temporarily update his or her status (presence status) for each of the social network applications for which he or she is registered. Indeed, for that, the user will have to successively connect to each of the server platforms for these applications in order to modify his or her status, which is tedious.

The present invention aims notably to improve the situation summarized above.

SUMMARY OF THE INVENTION

The present invention proposes, according to a first aspect, a method for updating a presence status of a user of a communication terminal for a set of at least one communication application, the terminal being connected to a communication network via at least one network interface.

The abovementioned method is noteworthy in that it comprises the following operations:

- detection, in the terminal, of a functional event of which a consequence is a future deactivation of the network interface;
- sending, by the terminal to a server on the network, called "status update server", of a network interface deactivation event notification, called "event notification", this event notification including an identifier of the user;
- following the reception of the event notification by the server, determination, based on the identification of the user, for at least one communication application, of a specific presence status corresponding to the event detected;
- sending, by the server, to at least one network platform hosting said at least one communication application, of a request to update a current presence status of the user for the communication application concerned, with the specific presence status for the communication application concerned.

By virtue of such a method, the detection in the terminal of an event—such as, for example, a switch to airplane mode, loss of network coverage, or a system notification warning that the level of the battery of the terminal is below a certain threshold—automatically triggers, in the terminal, the sending of a notification to a server on the network ("status update server"), before the network connection is effectively cut. This notification (event notification) results in the automatic updating of a current presence status of the user for each of the communication applications supervised by the abovementioned server, for example social network applications, with a predefined specific presence status (also called "status").

Such a specific status will be chosen beforehand by the user in order, for example, to indicate to his or her contacts, for the communication applications concerned, that he or she is unreachable because of a temporary lack of network connectivity, but everything is otherwise fine.

According to a particular implementation of the method, the set of at least one communication application comprises at least two communication applications, the server determining, based on the identifier of the user, a specific presence status for each of the communication applications, and sending, to each network platform respectively hosting at least one of the communication applications, an abovementioned request to update a current presence status of the user for the communication application concerned.

According to a particular feature of the abovementioned method, the operation of determination of a specific presence status comprises the obtaining, based on the identifier of the user, on the one hand, of configuration information concerning a specific presence status corresponding to the event detected, for each of the communication applications, and, on the other hand, information on access to the network platforms respectively hosting the communication applications.

Thus, according to this feature, the status update server can centralize the configuration of a specific presence status corresponding to the event detected, for each of the communication applications, and, on the other hand, the information allowing access to the network platforms hosting the communication applications, to perform the updating of the presence status.

According to a feature of an embodiment, the method further comprises an operation of reception, by the server, of a response from each network platform, indicating the success or failure of the updating of the presence status of the user for each of the communication applications.

Thus, it is possible to have available a log of the results (success or failure) of the successive updates of the presence statuses for the communication applications concerned.

According to another feature of embodiment dependent on the implementation of that explained above, the method further comprises an operation of transmission, from the server to the terminal, of a notification indicating, for each of the communication applications, the result of the updating of the presence status of the user.

In this way, the user will be able to be informed, for example by a notification displayed on the screen of his or her terminal, of the result of the update.

According to a particular embodiment of the method, the detection of a functional event includes the detection of an event belonging to at least the following set of events:
reception of information indicating that the battery of the terminal is weakly charged;
reception of information indicating that the network coverage is below a defined level or threshold;
execution of a network interface deactivation command;
execution of a command to switch the terminal to airplane mode.

According to other features of an embodiment of the proposed method:
The event notification is sent to the status update server in the form of a request using a protocol of HTTP (Hypertext Transfer Protocol) type.
The specific present status configuration information for each of said communication applications, and the information on access to the network platforms respectively hosting the communication applications, are obtained by the server by interrogation of a database incorporated in the server or that can be accessed by the latter via a communication network.
The communication applications are social network applications in which the user can parameterize a presence status.

Correspondingly, according to a second aspect, the subject of the invention is a communication terminal comprising at least one network interface allowing the terminal to connect to at least one communication network. This terminal is noteworthy in that it comprises a client software element designed to cooperate in the updating of a presence status of a user of the terminal for a set of at least one communication application.

This client software element comprises:
a detection module configured to detect, when the terminal is connected to the communication network, a functional event of which a consequence is a future deactivation of the network interface;
a sending module configured to send, to a server on the network, called "status update server", a notification of a deactivation event concerning the network interface, called "event notification"; this event notification, once received by the server, provoking the sending, by the latter, to each of the network platforms hosting the communication applications, of a request to update a current presence status of the user for each of the communication applications, with a specific presence status of the user corresponding to the functional event detected.

According to a third aspect, the subject of the invention is a server connected to a communication network, this server comprising a server software element designed to cooperate in the updating of a presence status of at least one user of a communication terminal for a set of at least one communication application.

The abovementioned server software element comprises:
a notification reception module, configured to receive, from at least one user terminal, notifications relating to events detected in the terminal, these events resulting in a future deactivation of a network interface of the terminal, each of the event notifications received including an identifier of a user of the terminal;
an analysis module configured to, following the reception of such an event notification, determine, on the basis of the identifier of the user included in the notification, for each of the communication applications, a specific presence status corresponding to an event detected in the user terminal;
a request sending module configured to send, via the network to each network platform respectively hosting at least one of the communication applications, a request to update a current presence status of the user for the communication application concerned, with the specific presence status for the communication application concerned.

According to a fourth aspect, the subject of the present invention is a system for updating a presence status of a user of a communication terminal for a set of at least one communication application, the terminal being connected to a communication network via at least one network interface, the system comprising:
a communication terminal as briefly summarized above; and
a server as briefly summarized above.

Finally, according to a fifth aspect, the present invention relates to a software element incorporated in a communication terminal or in a server as briefly described above, this software element comprising program instructions, the execution of which by a computer processor situated in the terminal or the server provokes the implementation of the corresponding actions of a method for updating a presence status of a user for a set of at least one communication application, as summarized above.

Such a software element can use any programming language, and comprise one or more programs in the form of source code, object code, or an intermediate code between source code and object code, such as in a partially compiled form, or in any other desirable form.

The invention also consequently targets, according to a last aspect, a computer-readable information storage medium, on which is stored a software element (computer program) as summarized above. Such a storage medium can consist of any device capable of storing such a software element.

For example, the medium can comprise a storage means, such as a ROM, for example a CD ROM or a microelectronic circuit ROM, or even a removable storage means such as a USB key or a magnetic storage means, such as a hard disk. Also, a software element according to the invention can in particular be downloaded over a network of Internet type.

The advantages obtained by a communication terminal, a server, a software element, as briefly defined above, are identical or contribute to those mentioned above in relation to the method for updating a presence status of a user, according to the invention, and consequently will not be reviewed here.

BRIEF DESCRIPTION OF THE DRAWINGS

Other features, details and advantages will become apparent on reading the following detailed description, and on analyzing the attached drawings, in which.

DETAILED DESCRIPTION

Figure 1:
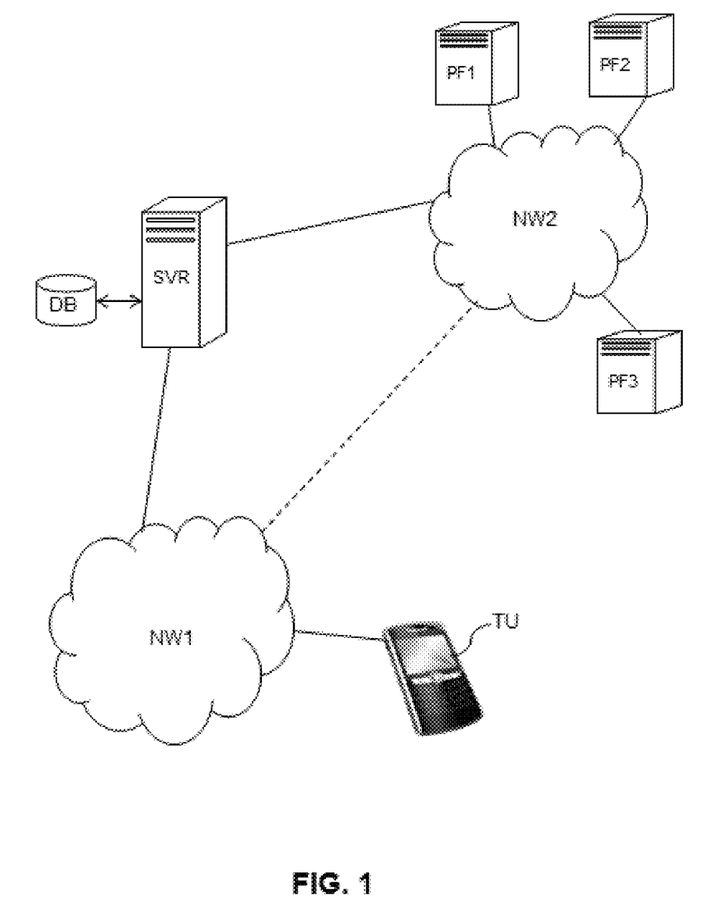
FIG. 1 represents an example of a telecommunications environment in which the method according to the invention can be implemented.

FIG. 1 represents a telecommunications environment in which the method according to the invention can be implemented. This environment comprises a communication terminal TU such as a mobile phone of smartphone type, of a user, linked to a mobile telephony network (3G, 4G) that is not represented, giving access to a first network NW1 of Internet type, to which there is also connected a server SVR, associated with a database DB. The server SVR constitutes a "user status update" server in the sense of the present invention, and is also connected to a second network NW2, such as a computer network, which can be a private network of intranet type, distinct from the network NW1, or else included therein.

The telecommunications environment represented in FIG. 1 also comprises network platforms PF1, PF2, PF3 (only three represented by way of example) respectively hosting one or more communication applications. The platforms PF1-PF3 are, here, represented as being connected to the same network NW2, but each of these platforms can be connected to a network distinct from that to which the other platforms are connected. Moreover, the terminal TU can also connect directly to the network NW2, for example for the user of the terminal to be able to him or herself update his or her user status directly with each of the communication applications for which he or she has a user account.

It will be noted here that the communication applications considered in the context of the present description are essentially online communication applications, which offer the possibility for the user to parameterize his or her presence status (communication status) to indicate to his or her contacts his or her availability to communicate. Such applications are typically the instant messaging applications such as WhatsApp™, or else, more generally, so-called online social network applications such as Facebook™, Instagram™, Twitter™.

In the environment represented in FIG. 1, the principle of the method for updating a presence status, according to the invention, is as follows: the mobile terminal TU detects a functional event of which a consequence is a future deactivation of a network interface of the terminal, for example the mobile network interface; following this detection, the terminal (TU) sends to the server SVR a notification indicating the imminent deactivation of its network interface; the server SVR receives this notification, called "event notification", and extracts from it a user identifier, for example a subscriber number associated with the terminal; the server then determines, for each application of a set of communication applications referenced in the server as corresponding with the user identifier, a specific presence status corresponding to the event detected; finally, the server SVR sends each network platform (PF1-PF3) a request to update the current presence status of the user for the corresponding hosted communication application, with the specific presence status for this communication application.

The implementation of the method for updating a presence status, briefly summarized above, relies essentially, on the one hand, on a so-called "client" software element incorporated natively in the terminal of the user or downloaded then installed thereby in the terminal (in this case, it will rather be termed "application"); and, on the other hand, on a so-called "server" software element incorporated in the server SVR. Moreover, the operator or the provider of the presence status (or user status) update service, described here, will have to have previously obtained, from the providers of the communication applications hosted by the platforms (PFi), privileged access in order to be able to drive the updating of user statuses, with corresponding communication applications, instead of the users themselves.

Figure 2:
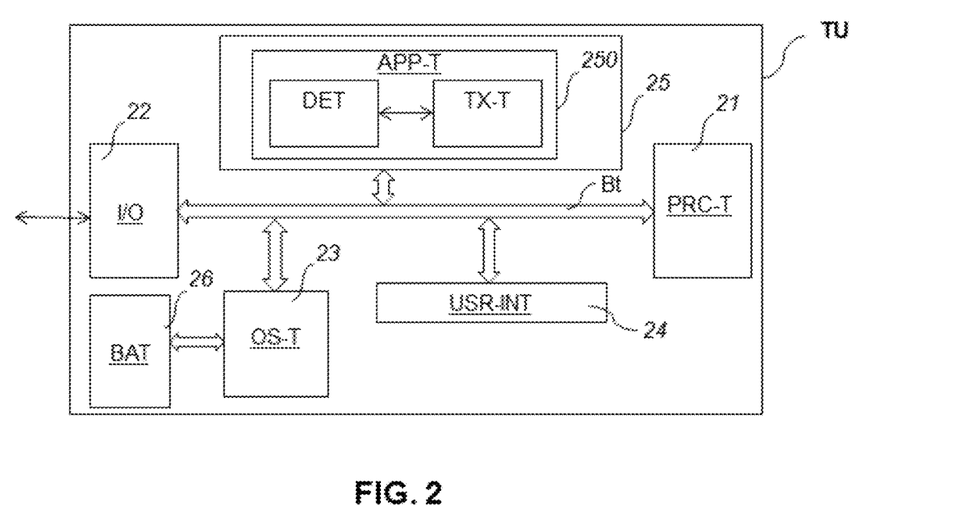
FIG. 2 represents the functional module client software element incorporated in a communication terminal according to the invention.

FIG. 2 represents the functional modules of a client software element incorporated in a communication terminal according to the invention. As illustrated in FIG. 2, the terminal TU is composed of elements arranged according to a conventional computer hardware architecture, notably comprising a processor (PRC-T) 21 and a memory 25 comprising memory components of ROM and RAM type and communicating via a set of databuses (Bt). The terminal (TU) also comprises a battery (BAT) 26, the level of charge of which can be communicated to an operating system module OS-T (23) of the terminal.

From a functional point of view, the terminal TU, here a mobile terminal of smartphone type, includes in particular the functional modules detailed hereinbelow:

A network communication interface I/O module (22), configured to communicate, via a mobile telephone network (not represented) and the network NW1 (of Internet type), with equipment connected to the network NW1 such as the server SVR. To this end, the network interface module 22 can use various communication protocols such as, for example, a protocol of HTTP (HyperText Transfer Protocol) or HTTPS (HyperText Transfer Protocol Secure), or SIP (Session Initiation Protocol) type.

The operating system module (OS-T) 23, for example the Android™ operating system from the company Google, managing the interaction between the various modules of the terminal and the processor (PRC-T).

A user interface module 24 (USR-INT) associated with a display screen (not represented) and, if necessary, with a keyboard (touch or mechanical) and communicating with the various applications installed on the terminal to graphically present to the user of the terminal data relating to the operation of the applications installed in the terminal, and notably of the client software element according to the invention.

The client software element (APP-T) 150, stored in the memory 25, and notably comprising a detection module (DET) for detecting a functional event as defined above, and a sending module (TX-T) for sending a notification, as defined above, relating to a detection of a network interface 22 deactivation event.

A timer module (not represented) configured to trigger a timer in order to offset in time a deactivation of the network interface (22) following a deliberate action (command) from the user on the terminal, so as to allow the sending module (TXT-T) of the client software element (25) to communicate with the server software element (35) of the server (SVR) to command the updating of the presence status of the user for the communication applications supervised by the server.

Figure 3:
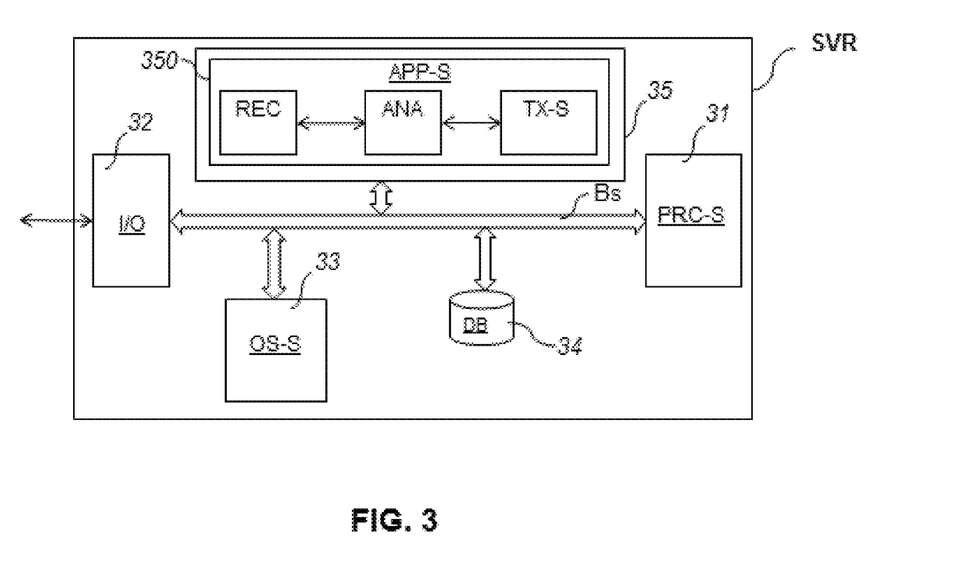
FIG. 3 represents the functional modules of a server software element incorporated in a status update server, according to the invention.

FIG. 3 represents the functional modules of a server software element incorporated in a server according to the invention, here designated "status update server". As illustrated in FIG. 3, the server SVR is also composed of elements arranged according to a conventional computer hardware architecture, notably comprising a processor (PRC-S) 31 and a memory 35 comprising memory components of ROM and RAM type and communicating via a set of databuses (Bs).

From a functional point of view, the server SVR includes in particular the functional modules detailed hereinbelow:

a network communication interface I/O module (22), configured to communicate, via the network NW1 (of Internet type), with user terminals such as the terminal TU, and via the network NW2 with service platforms (PFi) hosting communication applications for which a user can parameterize a presence status. To this end, the network interface module 32 of the server can also use various communication protocols such as, for example, a protocol of HTTP, HTTPS or SIP type.

An operating system module (OS-S) 33, for example the Linus or UNIX operating system, managing the interaction between the various modules of the server and the processor (PRC-S).

A database module (DB) 34 intended to store specific presence status configuration information for each of the communication applications for which the updating of the user statuses is managed by the server, and the information on access to the network platforms respectively hosting the abovementioned communication applications. In FIG. 3, the database is represented as being a functional module incorporated in the server, but, according to other embodiments, this database may be incorporated in other network equipment that can be accessed by the server SVR.

The server software element (APP-S) 350, stored in the memory 35, and notably comprising a module (REC) for receiving event notifications as defined above, an analysis module (ANA) configured to determine, for each of the communication applications, a specific presence status, as explained above, and a sending module (TX-S) for sending presence status update requests, to the service platforms (PFi) hosting the abovementioned communication applications.

Figure 4:
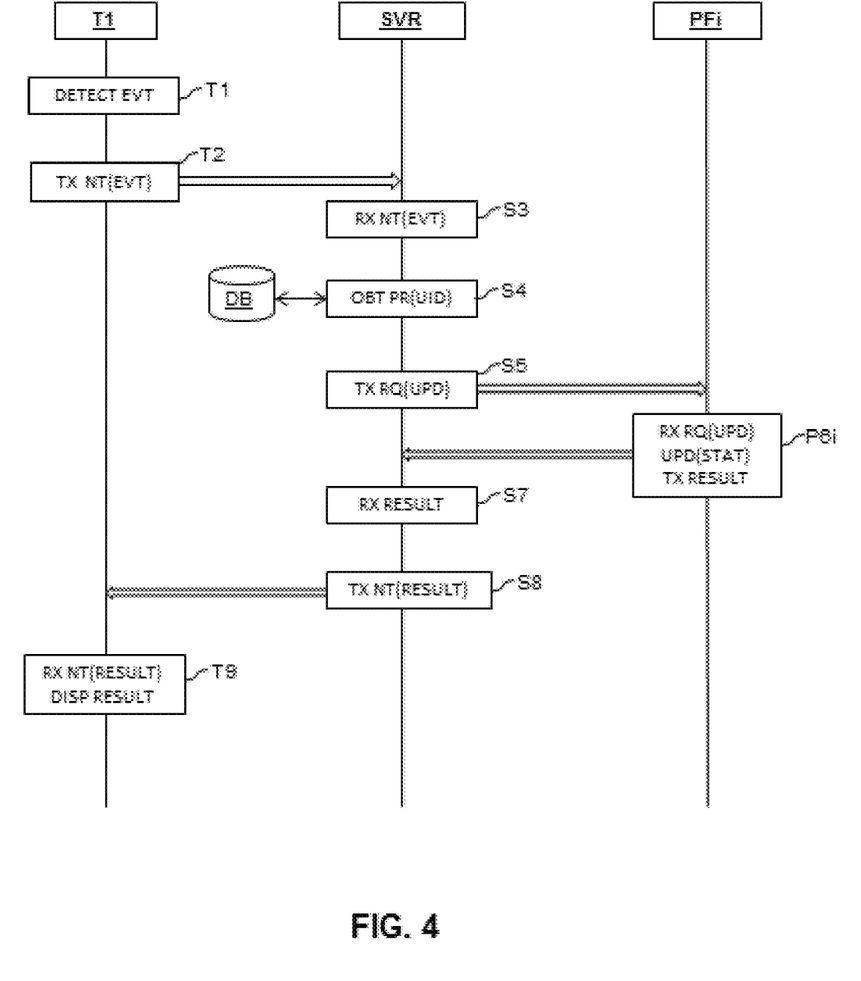
FIG. 4 represents, in flow diagram form, the main steps of a method for updating a presence status of a user of a communication terminal for a set of communication applications, according to the invention.

In association with FIG. 4, there will now be detailed, according to an exemplary implementation, the main steps of the method for updating a presence status of a user of a communication terminal for a set of communication applications. In this example, the method is implemented in the environment of FIG. 1 and by network equipment described in relation to FIGS. 2 and 3.

As represented in FIG. 4 and with reference to the environment of FIG. 1, the method initially comprises, in the user terminal TU, an action of detection T1 by the abovementioned detection module DET of a functional event of which a consequence is an imminent deactivation of the network interface (22) of the terminal.

Such an event may be independent of the user, linked for example to the physical environment of the terminal or to the charge of the battery of the terminal, more specifically:

the reception of information from the operating system (OS-T) indicating that the level of charge of the battery (BAT) of the terminal is low, for example that it has reached a predefined threshold (for example less than 10%);

the reception of information from the operating system indicating that the network coverage (mobile network) is becoming limited, for example below a predefined threshold, or when the 4G network becomes inaccessible, only 3G access being possible.

Such an event may also follow a deliberate action from the user on the terminal, such as, for example, the execution of a network interface deactivation command, for example to save the battery of the terminal or limit the quantity of data transmitted or received in order to limit a cost of billing of the data exchanged (outside of operator coverage for example); such a command can also be a command to switch the terminal to airplane mode, in particular if traveling in an airplane. In the case of a deliberate action from the user on the network interface of the terminal aiming to deactivate the network interface, it is recalled here that the client software element of the terminal (25) implements a timer in order to offset this deactivation in time so as to allow the client software element (25) to communicate with the server software element (35) of the server (SVR) in order to update the presence status of the user for the communication applications supervised by the server.

Returning to FIG. 4, following the step T1 of detection of such a functional event, the sending module (TX-T) of the client element (250) generates and sends an event notification (NT(EVT)) to the server SVR during the step T2. This notification is, for example, a request of HTTP type and includes an identifier of the user, for example an identifier of a subscriber to the presence status update service provided by the server SVR, this identifier being able to be also, according to an exemplary embodiment, a telephone number of a subscriber to a mobile network of an operator, in practice an MSISDN (Mobile Station ISDN Number) number stored in a SIM (Subscriber Identity Module) card incorporated in the terminal TU.

In the next step S3, the event notification (NT(EVT)) is received by the server SVR via the network NW1 and more specifically by the notification reception module (REC) of the server element (APP-S) 350, then is analyzed, in the step S4, by the analysis module (ANA). To this end, the analysis module extracts the user identifier (UID) contained in the event notification and performs a search in the database BD to obtain user profile information (PR(UID)) associated with the extracted user identifier.

According to the embodiment described, the user profile information stored in the database BD with the user identifier as input key, comprises two types of information: on the one hand, configuration information concerning a specific presence status, corresponding to the detected event, for each of the communication applications supervised by the server entity (for the identified user); and, on the other hand, information on access to the network platforms respectively hosting the communication applications.

The abovementioned configuration information is information previously parameterized by the user during a preliminary configuration phase making it possible to define a specific presence status for each of the communication applications for which the user is a subscriber to the service according to the invention. The objective of this "specific presence status" is thus to allow the contacts of the user for a communication application concerned to be informed of a disconnection of the user of the application, prior to the actual disconnection because of a detected event.

The preliminary configuration phase of the presence status (also here designated "user status") update service consists for example of a data entry via a user interface in a configuration file stored in the database BD.

This "specific presence status", which must replace the current presence status for each of the communication applications, following the detection of a given event in the terminal of the user, will be able to be parameterized by the user such that this presence status is different depending on the communication application concerned (for the same event). Moreover, the specific presence status configured for a given communication application can also vary according to a type of event indicated in the notification transmitted to the server by the terminal. Thus, if the event corresponds to a low battery level, the status of the user for the application concerned will for example be able to be "disconnected following drained battery"; if the event corresponds to a mediocre network coverage, the new status information for this same communication application will for example be able to be "disconnected following loss of network coverage"; if the event results from a command executed by the user on the terminal, such as a switch to airplane mode, the new user status for the communication application concerned will for example be able to be "disconnected following switch to airplane mode".

Returning to FIG. 4, as mentioned above, the user profile information sought in the database BD with the user identifier as input key, during the step S4, also contains information on access to the network platforms respectively hosting the communication applications. The abovementioned information on access to the platforms hosting the communication applications is, for example, composed of web addresses (URL—Uniform Resource Locator) or any other means allowing a server (SVR) offering a status update service according to the invention, to remotely access a communication application management module, in such a platform.

Once the new presence status is determined for each of the communication applications, as explained above, in the step S5, the server software element (250) of the server SVR sends, via its sending module TX-S, to each network platform (PF1-PF3) respectively hosting one or more of the communication applications configured for the user in the database (BD), a request (RQ(UPD)) to update the current presence status (currently active) for the communication application concerned, with the new presence status ("specific" presence status) obtained previously (step S4) through consultation of the database BD.

In the step P6i (i varying from 1 to n, n being the number of platforms to be reached), the communication application management modules of the platforms receive the status update requests (RQ(UPD)) and trigger the requested user status update (UPD(STAT)), then send, to the server SVR (REC module), response (RESULT) messages indicating the result of the requested status update (success or failure).

The REC module of the server element 35 of the server SVR receives, in the step S7, via the I/O module (32), the update responses (RESULT) from the platforms PFi and transmits them to the analysis module (ANA). Depending on the implementation selected, the analysis module (ANA) will be able to be configured to trigger a new sending of an update request to a platform after having received a response indicating an update failure.

In the step S8, the sending module TX-S of the server element 35 sends, to the terminal TU, for each communication application for which the change of user status has been requested, a notification (NT(RESULT)) indicating the result (success or failure) of the initial update request (step S5).

In the step T9, if the network interface (I/O) 22 of the terminal (TU) has not yet switched to the inactive state, the client software element 250 receives the abovementioned notifications (NT(RESULT)) indicating the result of the user status update for the communication applications concerned, and provokes the communication (DISP(RESULT)) of these results to the user by means of a determined user interface. In practice, according to an exemplary embodiment, these results are communicated to the user in the form of notification bubbles (referred to as pop-up notifications or toasts) displayed on the screen of the terminal.

By virtue of the method according to the invention, implemented according to the embodiment given by way of example and described above, the user of a communication terminal such as a smartphone will be able to define a specific presence status for a certain number of communication applications—of instant messaging type or more generally of social network type—in order to indicate in substance, by this specific status, to his or her contacts for the communication applications concerned, that he or she is unreachable because of a temporary lack of network connectivity, but that everything is otherwise fine, and to do so before the network interface of the terminal is deactivated. The method relies on a client software element installed in the user terminal, natively or subsequently (in application form) by the user, and on a server software element with which a server on a communication network to which the terminal has access is equipped. This so-called "status update" server can thus centralize specific presence status configuration information corresponding to predefined events which are detected in the terminal, for each of the communication applications, and, on the other hand, information allowing access to the network platforms hosting the communication applications, to perform the updating of the presence statuses. It is moreover possible to have, in the server, a log of the result (success or failure) of the successive updates of the presence statuses for the communication applications concerned and inform the user of the terminal, by notifications transmitted by the server to the terminal, as to the result of each update of his or her presence status for the communication applications supervised by the server on behalf of the user.

The invention claimed is:

1. A method for updating a presence status of a user of a communication terminal for a set of at least two communication applications, the terminal being connected to a communication network via at least one network interface, the method comprising the following actions:
    detecting, in the terminal, a functional event of which a consequence is a future deactivation of the network interface;
    sending, by the terminal to a server on the network, called "status update server", a deactivation event notification concerning said network interface, called "event notification", said event notification including an identifier of the user, and said status update server memorizing current specific presence statuses associated with the communication applications respectively;
    following reception of said event notification by the server, determining, based on the identifier of the user, for at least two communication applications, specific presence statuses associated respectively with the communication applications corresponding to the detected event; and
    sending, by the server, to network platforms hosting said respective communication applications, requests to update the current specific presence statuses of the user for the communication applications concerned, with said determined specific presence statuses for the communication applications concerned.

2. The method as claimed in claim 1, wherein said action of determining specific presence statuses comprises obtaining, based on the identifier of the user configuration information concerning the specific presence status corresponding to the detected event, for each of said communication applications, and information on access to the network platforms respectively hosting said communication applications.

3. The method as claimed in claim 1, further comprising an action of receiving, by the server, a response from each network platform, indicating success or failure of the updating of the current specific presence status of the user for each of the communication applications.

4. The method as claimed in claim 3, further comprising an action of transmitting, from the server to the terminal, a notification indicating, for each of the communication applications, a result of the updating of the current specific presence status of the user.

5. The method as claimed in claim 1, wherein the detection of a functional event includes detection of an event belonging to at least the following set of events:
    reception of information indicating that a battery of the terminal is weakly charged;
    reception of information indicating that a network coverage is below a defined level or threshold;
    execution of a network interface deactivation command;
    execution of a command to switch the terminal to airplane mode.

6. The method as claimed in claim 1, wherein said event notification is sent to the status update server in the form of a request using a protocol of Hypertext Transfer Protocol (HTTP) type.

7. The method as claimed in claim 2, wherein the specific presence status configuration information for each of said communication applications, and the information on access to the network platforms respectively hosting the communication applications, are obtained by said server by interrogation of a database incorporated in the server or that can be accessed by the server via a communication network.

8. The method as claimed in claim 1, wherein said communication applications are social network applications in which the user can parameterize a presence status.

9. A communication terminal comprising:
    at least one network interface allowing the terminal to connect to at least one communication network; and
    a non-transitory computer readable medium comprising a client software element stored thereon and designed to cooperate in updating a presence status of a user of the terminal for a set of at least two communication applications, said client software element comprising:
        a detection module configured to detect, when the terminal is connected to the communication network, a functional event of which a consequence is a future deactivation of the network interface;
        a sending module configured to send, to a server on the network, called "status update server", that memorizes current specific presence statuses associated with the communication applications respectively, a notification of a deactivation event concerning said network interface, called "event notification";
        said event notification, once received by said server, provoking a sending, by the server to each of the network platforms hosting said communication applications, of a request to update the current presence statuses of the user for each of the communication applications, with a specific presence status of the user determined respectively for each of the communication applications and corresponding to the functional event detected.

10. A server connected to a communication network, said server comprising:
    at least one processor; and
    at least one non-transitory computer readable medium comprising a server software element stored thereon and designed to implement a method of updating a presence status of at least one user of a communication terminal for a set of at least two communication applications when the server software element is executed by the at least one processor, said method comprising:
    storing current specific presence statuses associated with the communication applications, respectively;
    receiving, from at least one user terminal, notifications relating to events detected in the terminal, said events resulting in a future deactivation of a network interface of the terminal, each of the event notifications received including an identifier of a user of the terminal;
    determining, following the reception of one said event notifications, based on the identifier of the user included in the notification, for each of the communication applications, specific presence statuses associated respectively with the communication applications and corresponding to the event detected in the user terminal;
    sending, via said network to network platforms respectively hosting the communication applications, requests to update the current specific presence statuses of the user for the communication applications concerned, with said determined specific presence statuses for the communication applications concerned.

11. A non-transitory computer readable medium comprising a software element stored thereon for implementing a method for updating a presence status of a user of a communication terminal for a set of at least two communication applications, said software element comprising instructions, which when executed by a processor of the terminal provokes performance of the following actions:
- detecting, when the terminal is connected to a communication network, of a functional event of which a consequence is a future deactivation of a network interface of the terminal;
- sending, to a server on the network, called "status update server", that memorizes current specific presence statuses associated with the communication applications respectively, a notification of a deactivation event on said network interface, called "event notification";
- said event notification, once received by said server, provoking a sending, by the server to each of the network platforms hosting said communication applications, of a request to update the current presence statuses of the user for each of the communication applications, with a specific presence status of the user determined respectively for each of the communication applications and corresponding to the functional event detected.

12. A non-transitory computer readable medium comprising a software element stored thereon for implementing a method for updating a presence status of a user of a communication terminal for a set of at least two communication applications, said software element comprising instructions, which when executed by a processor of a server connected to a communication network, provokes performance of the following actions:
- storing current specific presence statuses associated with the communication applications, respectively;
- receiving, from at least one user terminal, of notifications relating to events detected in the terminal, said events resulting in a future deactivation of a network interface of the terminal, each of the event notifications received including an identifier of a user of the terminal;
- following the reception of one said event notifications, determining, based on the identifier of the user included in the notification, for each of the communication applications, specific presence statuses associated respectively with the communication applications and corresponding to the event detected in the user terminal; and
- sending, via said network to network platforms respectively hosting the communication applications, requests to update the current specific presence statuses of the user for the communication applications concerned, with said determined specific presence statuses for the communication applications concerned.

* * * * *